US012755238B2

(12) United States Patent
Bonafide et al.

(10) Patent No.: US 12,755,238 B2
(45) Date of Patent: Oct. 6, 2026

(54) SMART SHELF LOGISTICS

(71) Applicant: Dell Products L.P., Round Rock, TX (US)

(72) Inventors: Jason Bonafide, Winter Garden, FL (US); Eric L. Caron, Ottawa (CA); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 18/606,304

(22) Filed: Mar. 15, 2024

(65) Prior Publication Data

US 2025/0292202 A1 Sep. 18, 2025

(51) Int. Cl.
*G06Q 10/087* (2023.01)

(52) U.S. Cl.
CPC .................................. *G06Q 10/087* (2013.01)

(58) Field of Classification Search
CPC ............. G06Q 10/087; G06Q 10/0872; G06Q 10/08741; G06Q 10/08724
See application file for complete search history.

(56) References Cited

U.S. PATENT DOCUMENTS

2019/0080283 A1* 3/2019 Millhouse .............. B65G 57/02
2024/0112138 A1* 4/2024 Glaser ................ G06Q 30/0641
2025/0245803 A1* 7/2025 Leahy .................... G06V 20/70

FOREIGN PATENT DOCUMENTS

CA 3011318 A1 * 1/2020 ............... G07G 1/14

OTHER PUBLICATIONS

Materials Handling and Storage, Occupational Safety and Health Administration (OSHA)—osha2236, Revised 2002.
Ultra-Wideband Positioning & Sensor Technology, Inpixon, https://www.inpixon.com/technology/standards/ultra-wideband (accessed Apr. 3, 2025).
Vimaan—Inventory Tracking Products, Delivering the truth to your WMS from your warehouse floor, https://vimaan.ai/inventory-tracking-products/ (accessed Mar. 13, 2025).
Vimaan DockTRACK—DockTRACK—receiving & shipping vision verification, https://vimaan.ai/inventory-tracking-products/docktrack/ (accessed Mar. 13, 2025).
Vimaan PickTRACK—PickTRACK https://vimaan.ai/inventory-tracking-products/picktrack/ (accessed Mar. 13, 2025).
(Continued)

*Primary Examiner* — Ariel J Yu
*Assistant Examiner* — Denisse Y Ortiz Roman
(74) *Attorney, Agent, or Firm* — Workman Nydegger

(57) ABSTRACT

Smart shelf logistics is disclosed. A shelf (or rack) in a warehouse environment may be equipped with a compute device and a radio transmitter. The shelf can detect or determine attributes such as center of gravity, capacity and open spots. This may be determined using information about pallets that is available for consumption. As new pallets enter the environment, shelves can bid on these pallets based on their attributes. This allows pallets to be routed and placed effectively. The smart shelf logistics system may also include a central component that allows logistics to be managed collectively based on data from multiple shelves.

20 Claims, 13 Drawing Sheets

(56) References Cited

OTHER PUBLICATIONS

Vimaan StorTRACK—StorTRACK, https://vimaan.ai/stortrack-cycle-counting-done-right/ (accessed Mar. 13, 2025).
Nexocode—Artificial Intelligence Development Company, https://nexocode.com/ (accessed Apr. 3, 2025).
Nvidia—AI-Enabled Warehouse Logistics, https://www.nvidia.com/en-us/industries/retail/supply-chain-management/ (accessed Mar. 13, 2025).
PolyCam—Polycam—LiDAR & 3D Scanner for iPhone & Android, https://poly.cam/ (accessed Mar. 13, 2025).
PolyCam/polyform: Tools for working with raw Polycam data, including export for NeRF and other formats, https://github.com/PolyCam/polyform (accessed Mar. 13, 2025).
PolyCam Object Capture—Object Capture, https://poly.cam/object-capture(accessed Mar. 13, 2025).
Inpixon—Two-Way Ranging (TWR), https://www.inpixon.com/technology/standards/two-way-ranging, (accessed Mar. 15, 2025).

* cited by examiner

SMART SHELF LOGISTICS

FIELD OF THE INVENTION

Embodiments of the present invention generally relate to logistics operations in various environments. More particularly, at least some embodiments of the invention relate to systems, hardware, software, computer-readable media, and methods for shelf-related logistics operations.

BACKGROUND

Warehouses play an important role in supply chains. However, warehouse environments can present a variety of challenges and dangers. The inventory stored (and frequently moved) in a warehouse can be very heavy and heavy machinery is therefore required to perform inventory-related tasks, which often include moving incoming inventory from docking to shelving and outgoing inventory from shelving to docking. On occasion, inventory may be moved within the warehouse.

In light of these circumstances, Occupation Safety and Health Administration (OSHA) has provided extensive safety practices and recommendations that apply to warehouse environments. Implementing these recommendations can be difficult. Further, notwithstanding the safety practices and recommendations, there is still room for improvement in their implementation and for safety in general.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to improving safety in an environment. More particularly, at least some embodiments of the invention relate to systems, hardware, software, computer-readable media, and methods for logistics operations that improve safety in an environment such as a warehouse environment.

Embodiments of the invention are discussed in the context of a warehouse environment, but may be implemented in other environments such as retail environments, dock environments, port environments, shipping environments, research environments, or the like. Embodiments of the invention are also discussed in the context of logistics operations, but are not limited thereto. Embodiments of the invention are also discussed in the context of vehicles such as robots and forklifts, which may be automated, but are not limited thereto.

Embodiments of the invention relate to improving safety in a warehouse environment by addressing safety concerns and risks that exist within the warehouse environment. These safety concerns and risks may exist or may arise in the normal course of operations. For example, a previously safe shelf may become overloaded if a pallet that is too heavy for the shelf is placed thereon. This may subject the shelf to toppling or collapse and may cause collateral damage. Embodiments of the invention relate to improving safety with respect to known, unknown, latent, and/or potential risks and dangers in an environment.

Figure 1A:
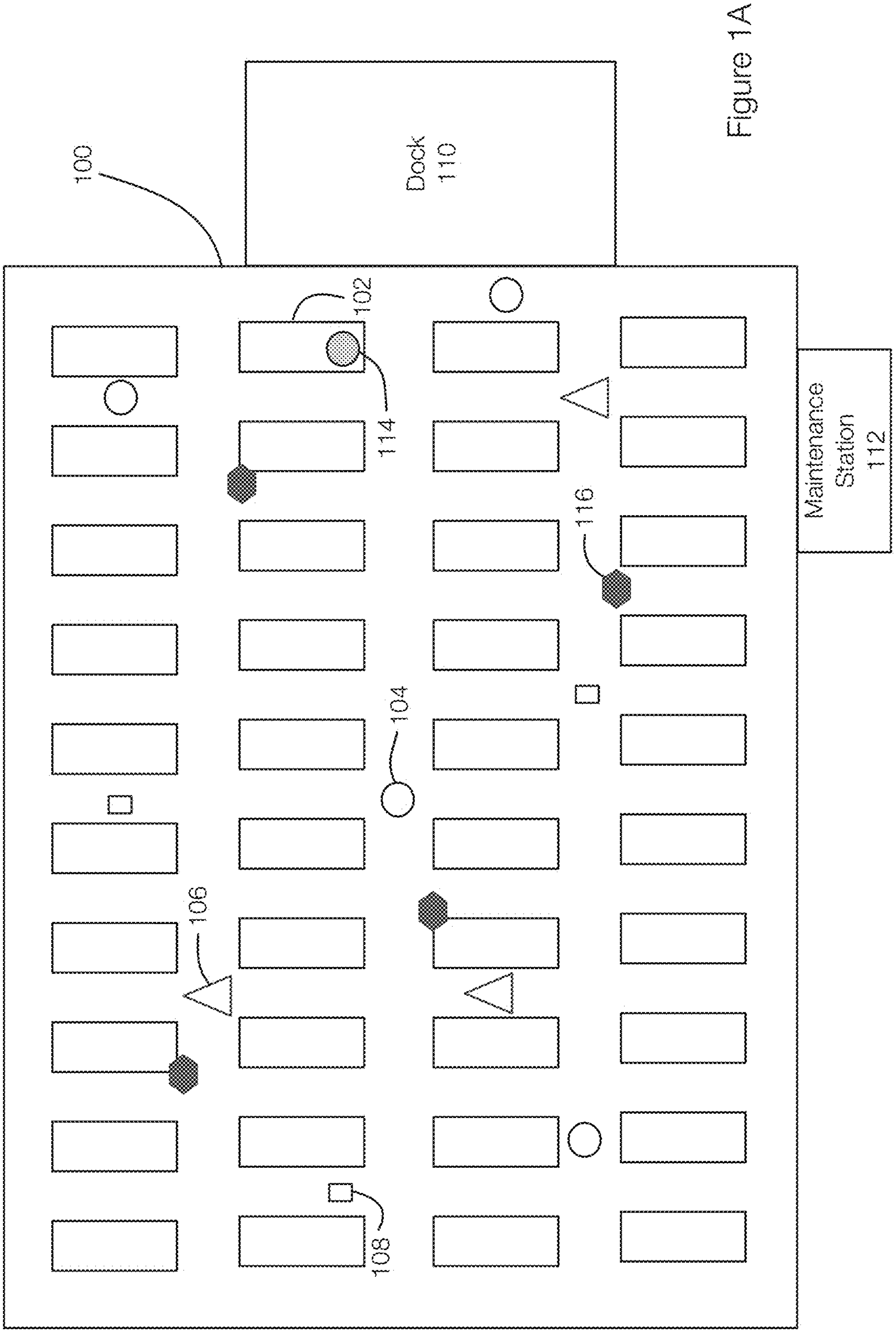
FIG. 1A discloses aspects of a warehouse environment.

FIG. 1A discloses aspects of a warehouse environment. FIG. 1A illustrates a warehouse environment 100 that includes racks or shelving that is represented by the pallet rack or shelf 102. The shelf 102 may be associated with a smart device 114. Pallets, which may be loaded with objects or goods, may be received into the warehouse environment 100 via a dock 110. Loaded pallets may also be shipped out of the warehouse 100 via the dock 110. A maintenance station 112 may also be available for storing vehicles, maintaining vehicles, or the like.

Objects operating in the environment 100 may include vehicles (e.g., robots 104, forklifts 106), and/or humans 108. Tasks performed by the robots 104 and the forklifts 106 may include moving pallets from the dock 110 to a shelf (e.g., incoming inventory), from one shelf to another shelf (e.g., inventory management), and/or from a shelf to the dock 110 (e.g., outgoing inventory).

The environment 100 may also include radio anchors 116. An ultra-wideband (UWB) anchor is an example of a radio anchor 116 and embodiments of the invention are discussed in the context of UWB anchors and UWB frequencies. The environment 100 may include multiple anchors 116 placed at various locations in the environment 100.

Figure 1B:
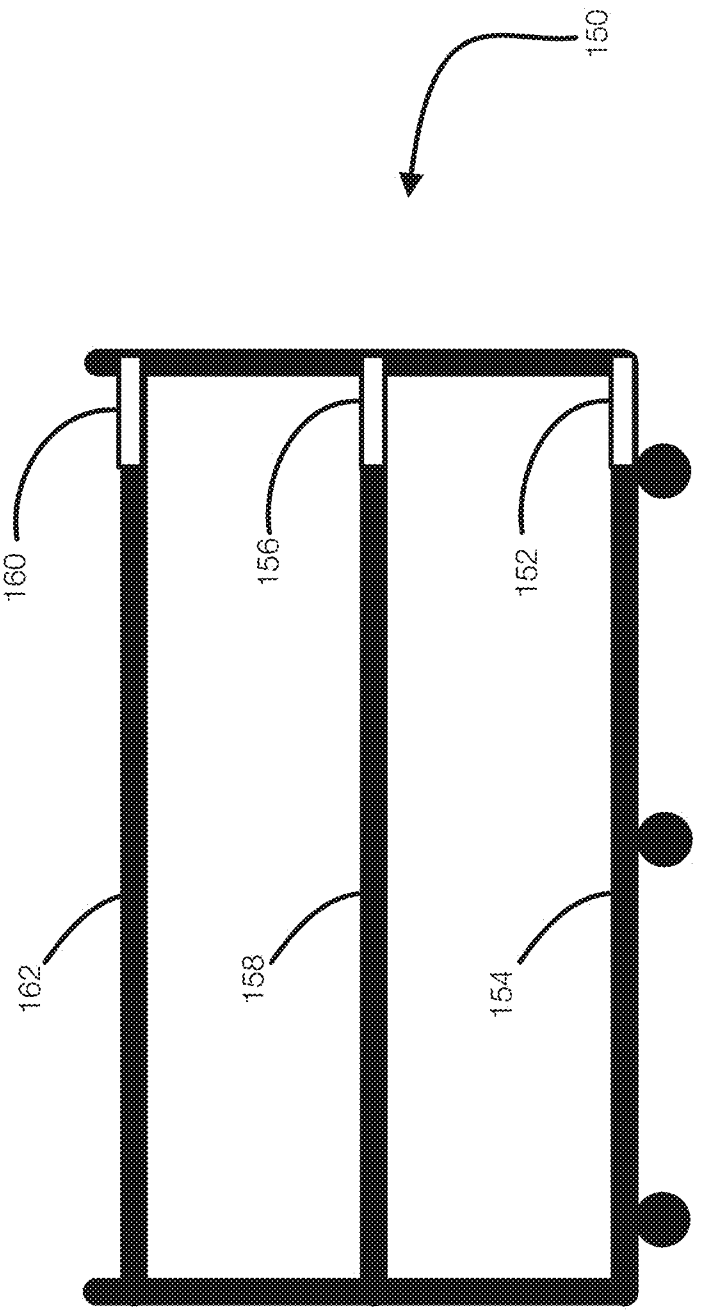
FIG. 1B discloses additional aspects of a shelf or a rack of shelves in a warehouse environment.

FIG. 1B discloses aspects of shelving in a warehouse environment. FIG. 1B illustrates a rack or shelf 150 that includes multiple shelves 154, 158, and 162. In this example, each of the shelves 154, 158, and 162 is a smart shelf and includes, respectively, compute devices (nodes) 152, 156, and 160. In another example, the shelf 150 may include a single compute device that is associated with each of the shelves 154, 158, and 162.

As described in more detail below, the compute devices may be configured to manage objects on the shelfs. The compute devices may be aware of object characteristics (e.g., shape, weight, dimensions) that allow objects or pallets placed on the shelf 150 to be managed. The compute device may also be able to determine the location of each pallet or object or be configured to determine a location of each pallet on the shelf. The compute devices may be aware of or determine characteristics or aspects of the shelf 150 including, but not limited to, open locations or spots, center of gravity, capacity, or the like. These characteristics may be determined for the shelf 150 as a whole, and/or for the individual shelves 154, 158, and 162.

Figure 2:
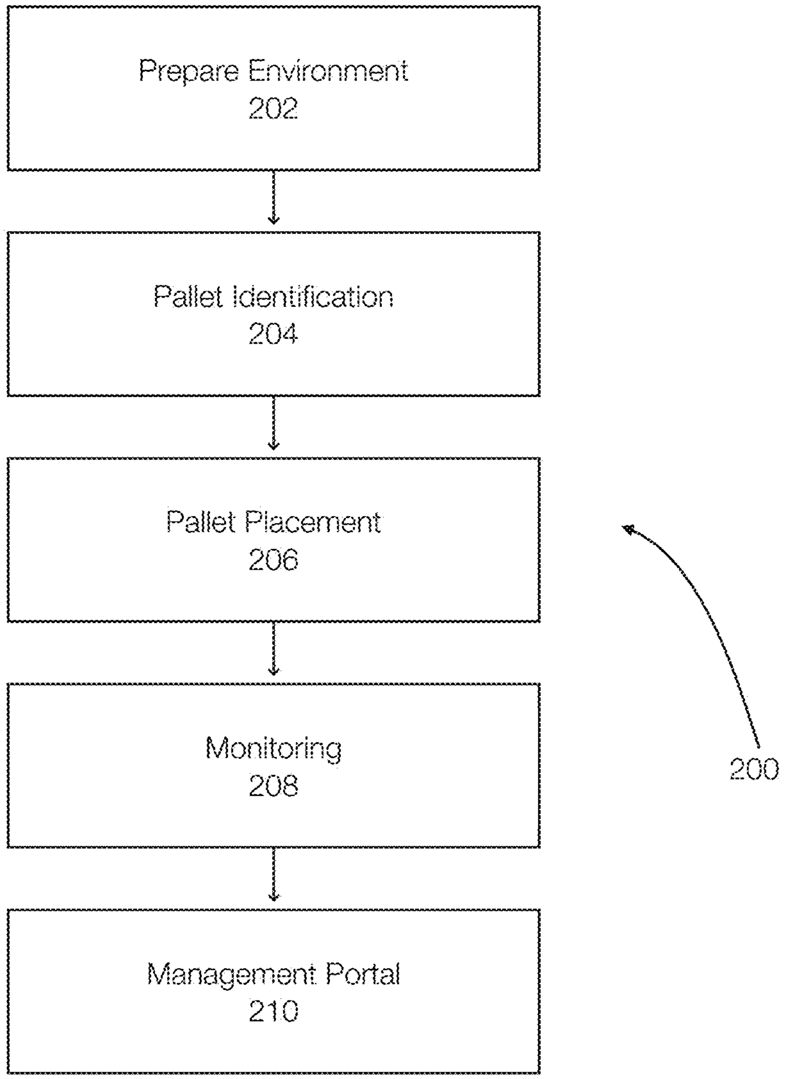
FIG. 2 discloses aspects of smart-shelf logistics.

FIG. 2 discloses aspects of smart-shelf logistics. FIG. 2 illustrates aspects of performing smart shelf logistics. These aspects, elements, or components of smart shelf logistics may be performed in or operate in an ongoing manner and may be performed or operate simultaneously and/or independently.

The shelf logistics system 200 may include elements or components that operate at each shelf (e.g., at edge nodes). Aspects of the shelf logistics system 200 may also operate at a central location (e.g., a central node at the warehouse or at a near edge). Aspects of the shelf logistics system 200 may also be cloud-based. The functions of the shelf logistics system 200 may dictate where the functions occur or are best suited.

For example, shelf logistics system 200 includes preparing 202 the environment, such as the environment 100. Preparing 202 the environment include deploying and/or configuring UWB anchors. The UWB anchors, which may be configured to perform both receiving and transmission operations, are configured to send signals that can be received by UWB receivers. This allows a distance (and/or direction) between the anchor and the receiver to be determined. When the UWB anchors are deployed in the environment, the location of an object (e.g., pallet, vehicle, a tagged object, or the like) can be determined with high accuracy (e.g., <10 centimeters). This allows objects or pallets to be tracked and located within the environment. This may also allow a compute device of a rack to determine locations of pallets on the rack (e.g., on shelves of the rack).

More generally, preparing 202 the environment includes placing UWB anchors (transmitters) at various locations around the environment (e.g., at each shelf or rack). While no particular placement strategy is required, the UWB anchors may be place, in one example, with an understanding that the anchors perform best when the distances being measured are less than 50 meters. Thus, in areas of the environment that may require UWB transmission/reception, the anchors may be placed accordingly.

The shelf logistics system 200 may also include pallet identification 204. In one example, pallet identification 204 includes adding a UWB receiver to a pallet, giving the pallet a unique identifier, weighing the pallet, capturing camera/video data with depth sensing information, and storing this information or data. These attributes, which may be discoverable, allow individual pallets to be identified and tracked and allow decisions to be made based on the pallet's attributes and/or location. More specifically, any rack or shelf can obtain the characteristics of a pallet by reading the pallet's tag (e.g., the UWB receiver) and accessing the data store accordingly.

Pallet placement 206 relates to a set of processes/applications that may reside on the compute device of each shelf (or at each edge node). Thus, each shelf may include a computing device. Using information about the pallets, the computing device may be configured to measure/determine/update a shelf's center-of-gravity, a shelf's capacity, obstruction data, a shelf's open spots, or the like. When a new pallet arrives in the warehouse environment, the shelf may be able to bid for the pallet based on shelf usage and configuration and/or other characteristics. Receiving bids from multiple shelves may allow the shelf logistics system 200 to effectively place the pallet by selecting the best bid. The best bid may be selecting the closest shelf for example.

Monitoring 208 relates to the applications or processes that collect data used in performing the logistics operations. Thus, monitoring 208 includes collecting data using one or more applications. This may include collecting data from the time pallets enter the warehouse to placement of the pallets on shelving. Because the shelves are monitoring their center-of-gravity, capacity, and/or obstruction, monitoring 208 may also include processes and applications that enable alerts and decision making processes with respect to availability. These processes and applications may be rule based or machine learning/artificial intelligence based.

A management portal 210 may provide a user interface that may be used to enable usability or to manage aspects of the logistics operations being performed. The management portal 210 may allow the environment to be visualized and allow pallets and shelves to be managed/visualized. The management portal 210 may allow alerts to be configured and generated, may handle events received from the shelves, provide 3D reconstructions of the racks, of the pallets, of the environment, combinations thereof, or the like. The shelf logistics system 200 is discussed in more detail in FIGS. 3A-7.

Figure 3A:
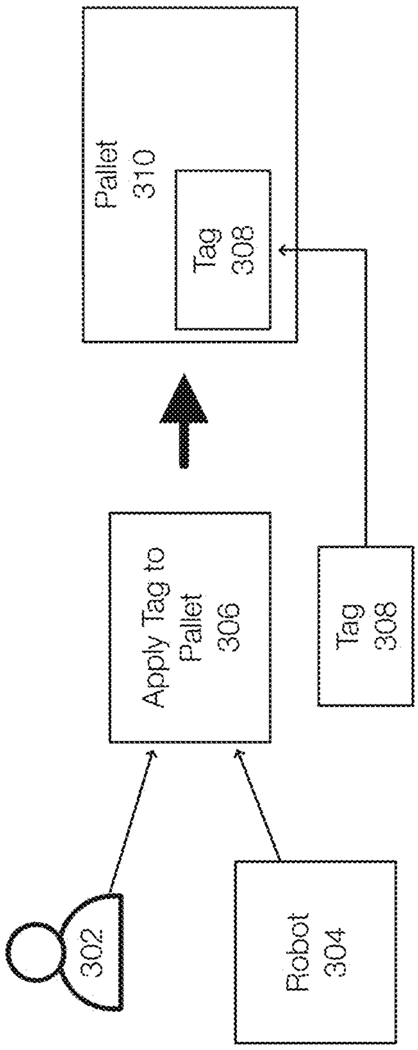
FIGS. 3A, 3B, and 3C disclose aspects of pallet identification in an environment.
Figure 3B:
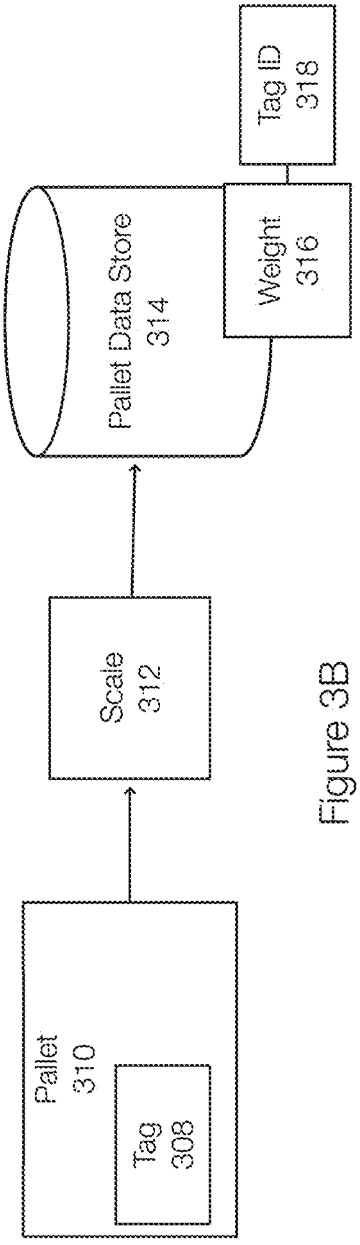
Figure 3C:
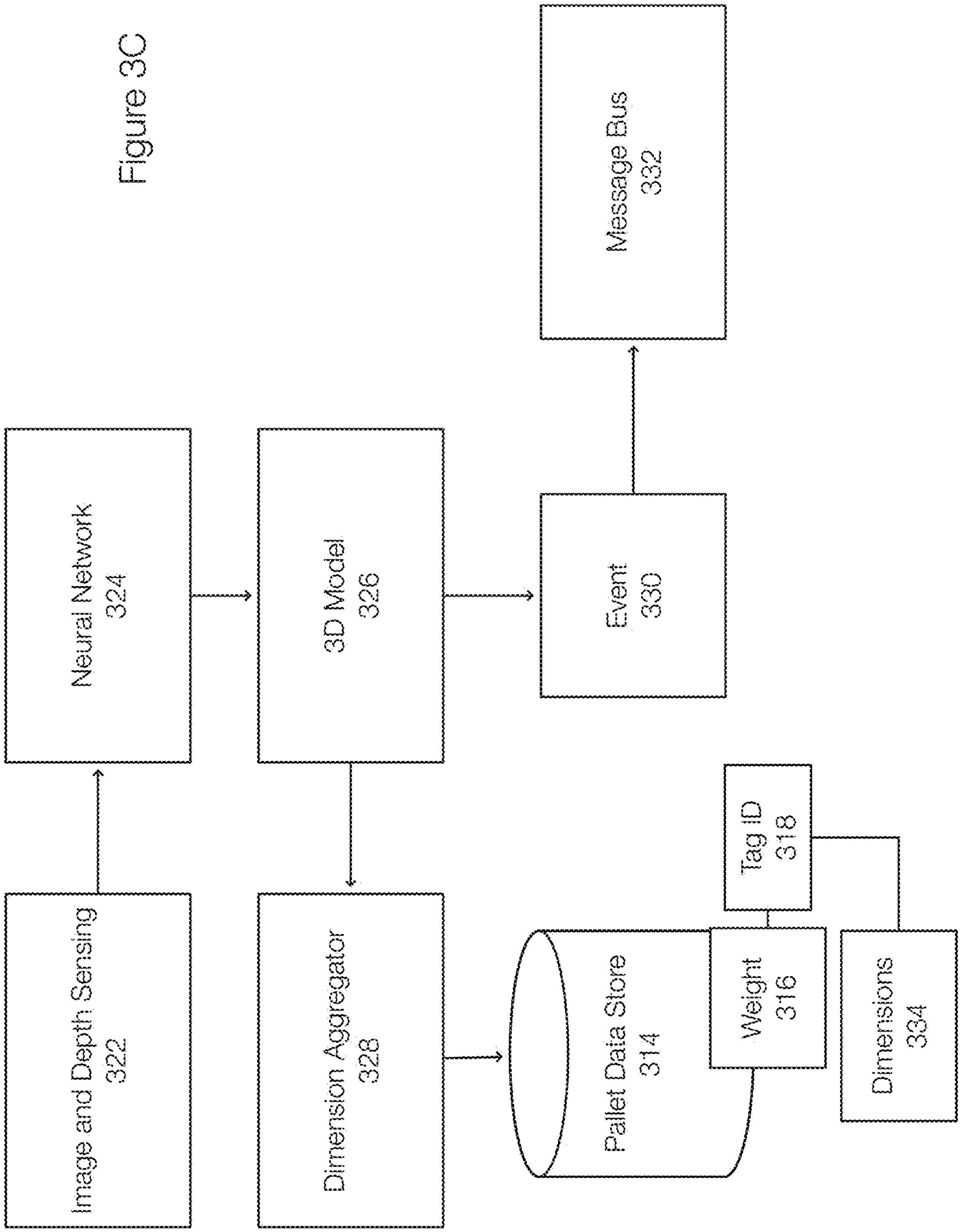

FIGS. 3A, 3B, and 3C disclose aspects of pallet identification in a shelf logistics system. Pallet identification in a shelf logistics system 200 is performed such that each pallet can be tracked in the environment and such that the characteristics or attributes of the pallet can be used in logistics decisions (e.g., where to place the pallet, which shelf to select, which route to take). Pallet identification may include several individual processes.

FIG. 3A discloses aspects of tagging a pallet. If a pallet has been previously used and already includes a tag, the characteristics or attributes of the pallet may be cleared or initialized in certain circumstances. For instance, the location of the pallet (at the dock), a detected weight (e.g., empty weight), or the like may suggest that the pallet is in the process of being reused.

More generally, a tagging operation is typically performed when a pallet enters the environment. In one example, a tag 308 may be applied 306 to a pallet 310 by a user 302 or automatically, for example by a robot 304. This may occur as the pallet is being received into the warehouse environment, or the like. The tag 308, in one example, is a UWB receiver. Tagging the pallet 310 with the tag 308 allows the attributes of the pallet to be stored in a data store (e.g., the pallet data store 314 in FIG. 3B). As the pallet 310 moves within the environment, the position or location can be tracked as the UWB anchors interact with the tag 308 to determine the pallet's position.

FIG. 3B illustrates aspects of acquiring characteristics or attributes about the pallet 310. In FIG. 3B, the pallet 310 may be loaded and weighed with a scale 312. The scale 312 may exist on conveyor belts or incorporated into the forklifts/robots. The weight 316 of the pallet is associated with a tag-ID and stored in the pallet data store 314. The pallet may be weighed at various times and the weight stored in the pallet data store 314 may be updated. For example, the pre-loading/post-unloading weights may differ from a loaded weight. This information may be used to detect a status of the pallet (used/unused). The weight, however, is useful to the smart shelves and allows the smart shelves to determine whether they can accept the pallet 310 for placement.

Generally, a warehouse receives loaded pallets. The pallets are thus tagged and weighed early in the intake process.

FIG. 3C discloses aspects of determining pallet dimensions. In one example, the dimensions of the pallet (e.g., when loaded) may be acquired at or about at the same time that the tag 308 is applied to the pallet 310 and/or the pallet 310 is weighed. Initially, an image and/or depth sensing 322 is performed. For instance, a camera or set of cameras may captures images of the pallet 310 from various angles. The cameras may also capture depth information. An RGB-D camera may be capable of capturing this type of information. Alternatively, a smartphone and polycam can be used to produce a 3D model of the pallet.

In one example, the images are input to a neural network 324 that outputs a 3D model 326. In one example, a digital twin of the pallet 310 can be generated and dimensions can be determined using the digital twin. The digital twin is an example of a dimension aggregator 328. Once the dimensions are acquired or determined, the dimensions are stored in the pallet data store 314. The dimensions 334 may represent height, width, and depth, a 3D reconstruction, or other representation or combinations thereof. Thus, both weight 316 and dimensions 334 are associated with the tag ID in the pallet data store 314.

Once the dimensions 334 and other attributes of a pallet are determined and stored in the pallet data store 314, smart shelves in the environment are notified that the pallet 310 is ready for placement via, in one example, a message bus 332. More specifically, the dimensions 334 and weight 316 of the pallet 310 allow the shelf logistics system 200 to make placement decisions. Each of the enabled shelves or racks may be able to make a bid for placement or signal their ability to accept the pallet.

Figure 4A:
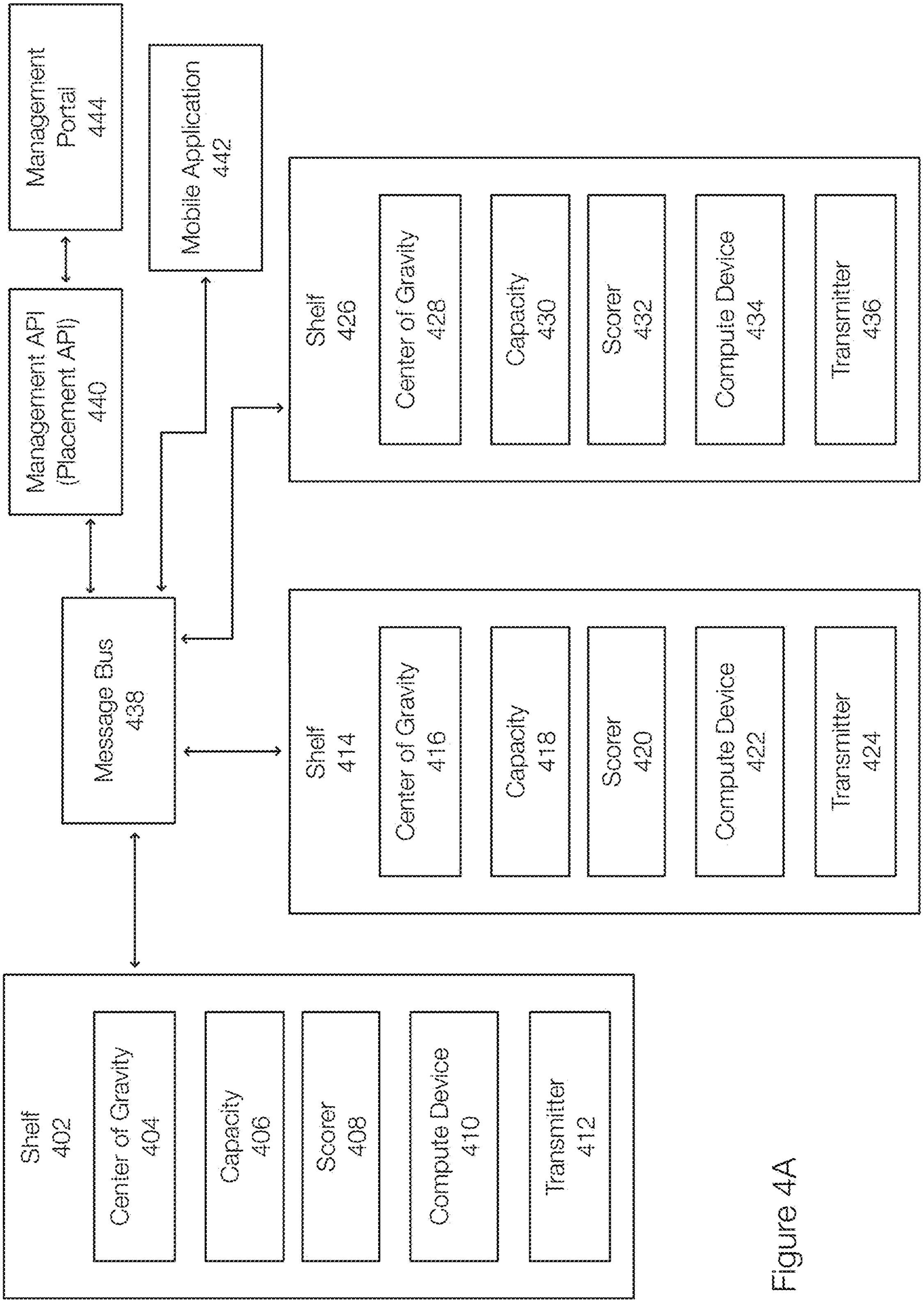
FIGS. 4A, 4B, 4C, and 4D disclose aspects of pallet placement in an environment.
Figure 4B:
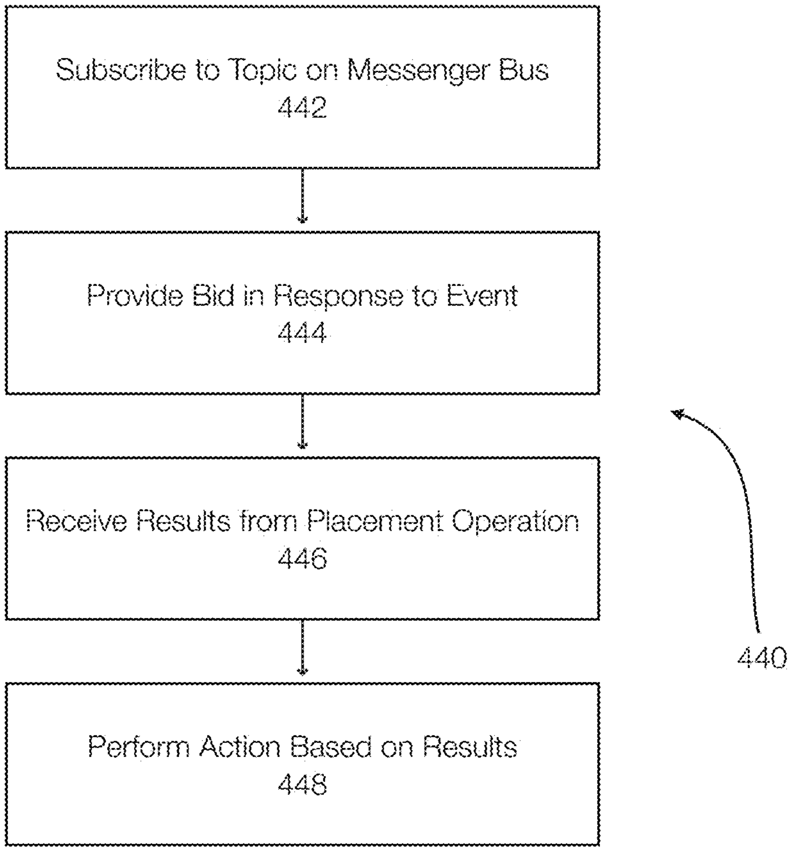
Figure 4C:
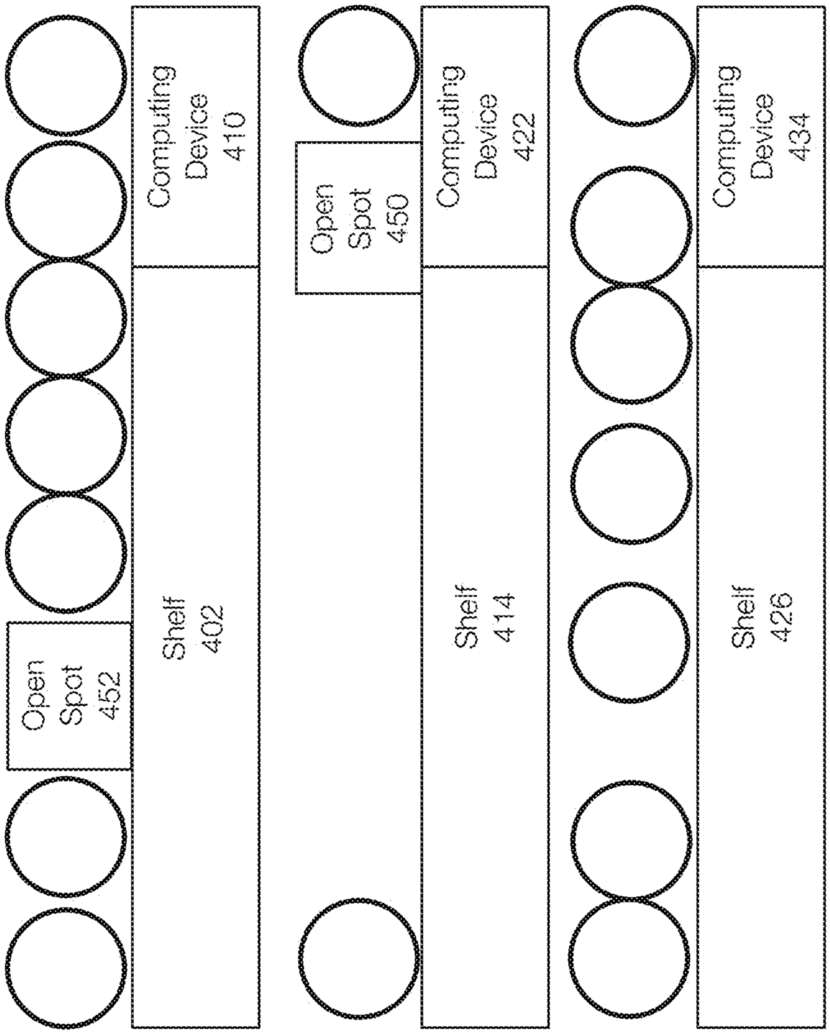

FIGS. 4A, 4B, and 4C disclose aspects of pallet placement in an environment. FIG. 4A illustrates example shelves 402, 414, and 426. These shelves 402, 414, and 426 each include, respectively, compute devices 410, 422, and 434, and UWB transmitters (or anchors) 412, 424, and 436. The shelf 402 is associated with a center of gravity application 404 configured to determine a center of gravity for the shelf 402, a capacity application 406 configured to determine capacity of the shelf 402 (or each of the shelves in the rack), and a scorer application 408 configured to perform bidding by generating a score related to its ability to accept additional pallets. The shelves 314 and 426 are similarly configured, respectively, with center of gravity applications 416 and 428, capacity applications 418 and 430 and scorer applications 420 and 432.

The shelf 402 may subscribe to the message bus 438. For example, the shelf 402 may subscribe to a new pallet topic. When an event in this topic is received or broadcast by the message bus 438, each subscribing shelf may calculate their center of gravity and capacity. Thus, the shelf 402 invokes the center of gravity application 404 and the capacity application 406 to determine a current center of gravity and a current capacity. In one example, the center of gravity is determined as if the new pallet were present on the shelf 402. The capacity may be determined in a similar manner. Further, the capacity may relate to open spaces on individual shelves and/or to a weight limit of the rack or of a specific shelf on the rack. Using the center of gravity and capacity, the scorer application 408 may generate a bid. The bid may generally indicate whether the rack or shelf can receive the pallet. The bid may also be scores such that multiple bids can be compared.

Thus, each of the subscribing shelves (e.g., shelves 402, 414, and 426) may publish a bid to the management portal 444 via the message bus 438 and the management (or placement) API 440. The management portal 444 may notify the winning bid via the message bus 438. Anytime a message is published to the message bus 438, the applications of the shelf may be triggered to recalculate the center of gravity and/or capacity. A shelf that does not win the bid may revert to its previous center of gravity and capacity or recalculate if necessary.

A mobile application 442 may also subscribe to the same and/or other topics. For example, the mobile application 442 may display aspects of the bid on a display (e.g., at a vehicle, on a smartphone, or the like). This mobile application 442 may display the location for the pallet to be placed, a 3D reconstruction of the pallet, or the like.

FIG. 4B discloses aspects of an example bidding process. In the method 440, shelves (or computing devices thereon) may subscribe 442 to a topic of a message bus. In response to an event or message (e.g., a new pallet message), each of the subscribing shelves may generate or provide 444 a bid in response to the event. A management portal (e.g., management portal 210) may evaluate the bids or perform a placement operation by returning 446 results over the message bus. Thus, the subscribing shelves are made aware of the results, which include identifying the winning shelf. This may cause the shelfs to recalculate their current or expected center of gravity and/or capacities. Actions may be performed 448 based on the results. For example, a robot or forklift may be assigned to perform the task and may be provided with the location to which the pallet should be delivered. The location may be displayed on a device (e.g., the mobile application 442).

FIG. 4C discloses aspects of open spot grading or scoring. In open spot scoring, the scorer application may assign values to shelves that may be based on open spots. Each open spot may receive its own score.

For instance, a shelf (or open spot on a shelf) further away from a forklift/robot may be given a lower score than a shelf (or open spot) closer to the forklift/robot. A shelf that is lower (e.g., nearer to the floor) may also receive a higher score compared to an open spot on a higher shelf. Pallets placed closer to the floor may improve the center of gravity of the shelf (e.g., by lowering the center of gravity in a height direction). Each open spot, if loaded, may have a different impact on the center of gravity. Thus, the new center of gravity for the shelf may be determined for each open spot with the assumption that the pallet is placed therein. These attributes allow a score to be generated for each shelf and/or for each open spot.

In one example, the shelves 402, 414, and 426 are not necessarily on the same rack and the shelves may be representative of multiple shelves in a single rack. For example, the shelf 414 has an open spot 450. If the right side of FIG. 4C is closer to the forklift, the open spot 450 receives a higher score for proximity to the forklift compared to the open spot 452. However, the open spot 452 of the shelf 402 may be closer to the floor than the open spot 450 of the shelf 414. As a result, the impact on the corresponding centers of gravity may differ and be reflected in the scores.

Figure 4D:
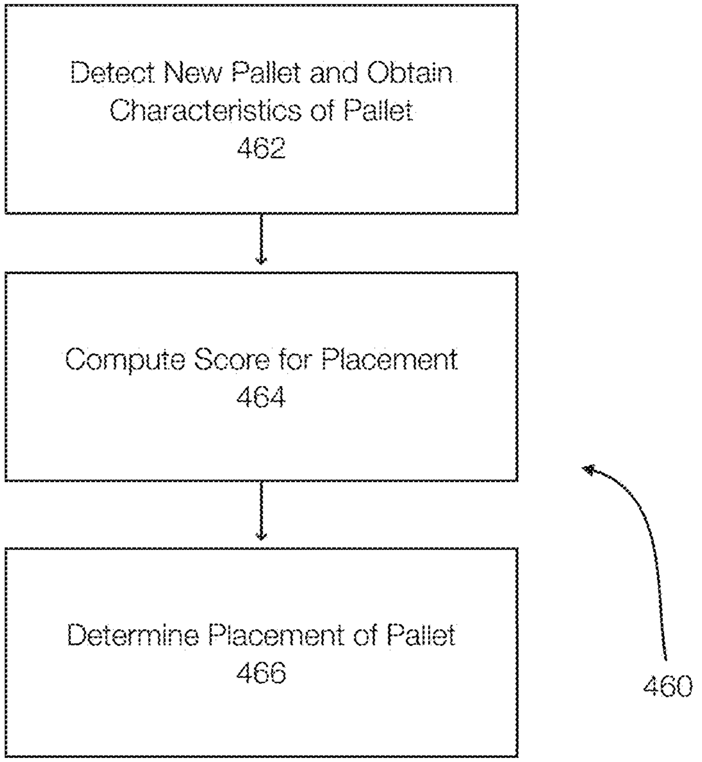

FIG. 4D discloses aspects of generating scores or bids for placing pallets. In the method 460, a new pallet p may be detected or a new pallet p enters the system (e.g., a pallet is tagged, weighed, and dimensioned). This event may be published over the message bus and characteristics (attributes) of the pallet may be obtained by the shelves racks. The characteristics may include dimensions, weight, a 3D reconstruction, or the like.

Next, a shelf s, which is equipped with a compute device, may locally compute 464 a score for placing the new pallet at each of the shelf's available open spots. The top scoring open spot is selected for that shelf and submitted in the bid. Generating or determining a score may consider the new center of gravity associated with each spot. This is performed as if the pallet were placed at the spot. The weight and/or dimensions may be used to determine the hypothetical center of gravity for each open spot. In one example, a particular spot may be excluded from consideration if the center-of-gravity calculation results in a score above a threshold score (e.g., it makes the center of gravity for the shelf too high and makes the shelf susceptible to tipping).

The shelf (or computing device) may also grade open spots from bottom to top. Open spots at the bottom are likely scored higher at least because pallets at the floor require less time to drop off/pickup and because of their impact on the center of gravity. Finally, open spots that are comparatively closer to the pallet's current location may also receive a better score. Thus, the top scoring spot is elected and submitted in a bid (e.g., using the determined score).

With the bids, placement of the pallet is determined 466. The decision may be performed at or by a robot/forklift. For example, if the position of the forklift/robot is available and an estimated time of travel to each open spot in the shelves is available, closer/more available spots may be selected by the forklift/robot. If the determination occurs at a central node (the management portal which may include a placement engine), the central node could rely on the positional tracking of other vehicles in the environment. When the decision is made at a central node (or locally), embodiments of the invention may also consider obstructions that may be present in the environment. For instance, some of the open spots may be obstructed (e.g., a delayed vehicle, a spill, debris, trash, tools).

The central node accepts scoring responses from individual shelves based on incoming pallet attributes (e.g., dimensions and weight). The central node or shelf selection manager selects an open spot based on a grading or scoring system where the shelf's location, capacity, and the elevation of the matching spots are taken into consideration.

Figure 5:
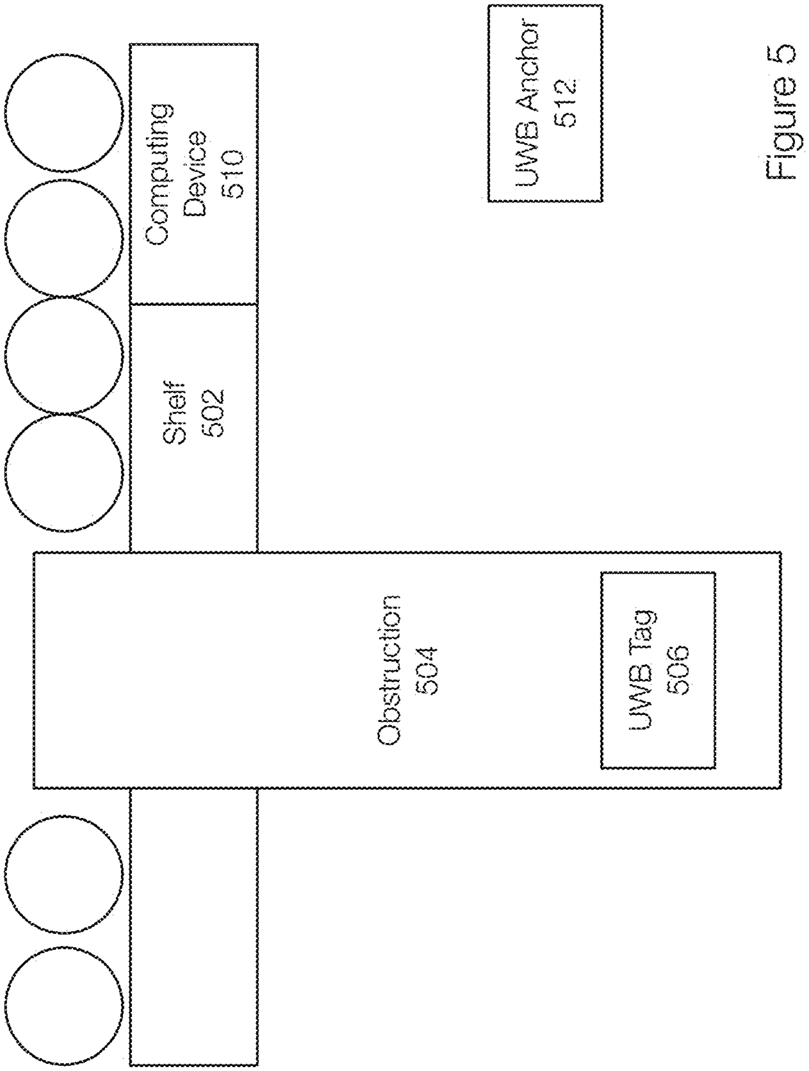
FIG. 5 discloses aspects of detecting and handling obstructions in an environment.

FIG. 5 discloses aspects of detecting and handling obstructions in an environment. FIG. 5 illustrates a shelf 502 that includes a computing device 510. An obstruction 504 is present that is blocking an open spot on the shelf 502 or a lane in the warehouse. In this example, the obstruction 504 includes a tag 506 that can be read by an anchor 512. In one example, the anchor 512 is attached to the shelf 502 (each shelf may include an anchor). This allows the shelf 502 to detect tagged objects, untagged objects, other objects in proximity to the shelf 502. This obstruction may be incorporated into the bidding process. Cameras may also be used to identify or verify a nature of the obstruction 504. A determination may be made to determine whether the obstruction is temporary or more permanent. For example, UWB positioning information may be used to determine whether the obstruction 504 has been mobile (e.g., permanently blocking the shelf 502 or a non-permanent obstruction).

Figure 6:
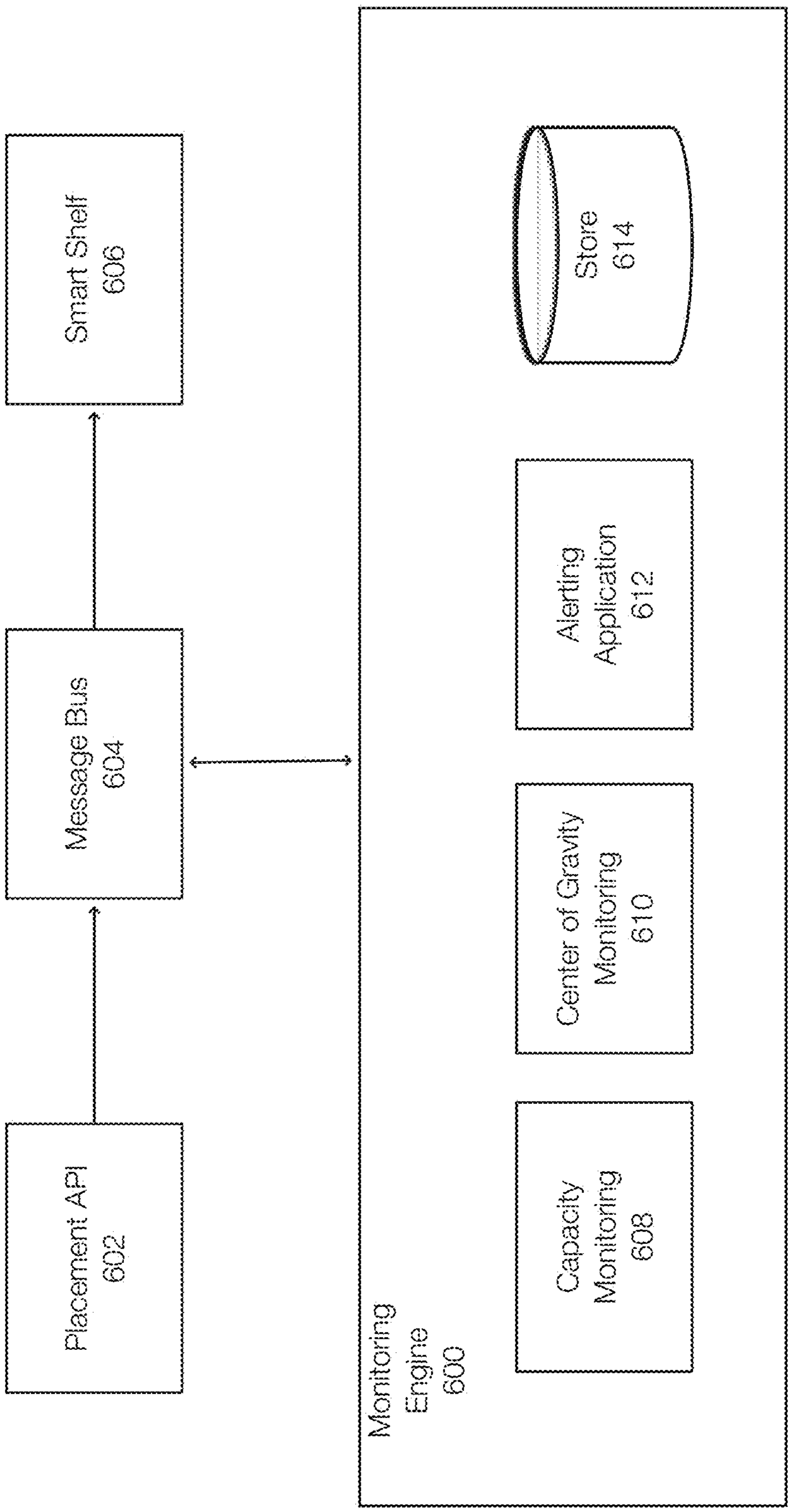
FIG. 6 discloses aspects of monitoring a logistics system in an environment.

FIG. 6 discloses aspects of monitoring in a shelf logistics system in an environment. In one example, a monitoring engine 600 may be configured to perform monitoring using information received from objects (e.g., shelves, vehicles) in the environment. Generally, shelves in the warehouse environment, as discussed herein, are aware of their usage and their attributes. This may include their center of gravity, capacity, available capacity, open spots or the like. This information can be delivered to the monitoring engine 600, for example using a message bus 604. The monitoring engine 600 can perform logistics operations in response to individual shelves or in the environment holistically. For example, if the warehouse as a whole approaches full capacity, incoming packages may be rerouted to alternat warehouses.

For example, capacity monitoring 608 is performed by the monitoring engine 600. Because pallets are tracked in the environment, the capacity of shelves in the warehouse environment can be tracked. This may be performed in terms of weight, in terms of percent full (how many unused spots), or the like. Capacity, which may include historical capacity, can be stored over time in the store 614. When sufficient data is available, machine learning models can be trained to predict availability based on historical trends related to capacity.

Center of gravity monitoring 610 may be performed. For example, a forklift may add a pallet to a shelf that causes the center of gravity to be higher than a configured level. When this occurs, the shelf 606 may generate an alert (e.g., an audible warning) or the monitoring engine 600 may generate an alert (e.g., message administration). From a domain or environment perspective, the center of gravity monitoring can generate an alert or warning that would be investigated, for example, by an administrator or warehouse manager. An actionable warning may aid in determining why a driver did not follow a placement recommendation (e.g., the driver saw something that was not detected). Thus, a shelf may be able to determine whether a driver placed a shelf in the correct open spot by determining the position of the pallet using UWB.

Generally, embodiments of the invention may operate under the assumption that all pallets have been tagged and that the shelves are equipped with enough UWB anchors to detect pallets present anywhere within a shelf or rack. The compute device of a shelf or rack may have sufficient memory to track existing pallet inventory. Further, the compute device may be able to build an inventory when actuated by detecting the presence/absence of pallets on the shelf or rack of shelves.

The monitoring engine 600 may also have an alerting application 612. The alerting application 612 may be policy and/or rule based. Thus, alerts can be generated based on center of gravity measurements, capacity measurements, open spots that have been open for longer than a threshold time, obstruction presence, or the like.

Figure 7:
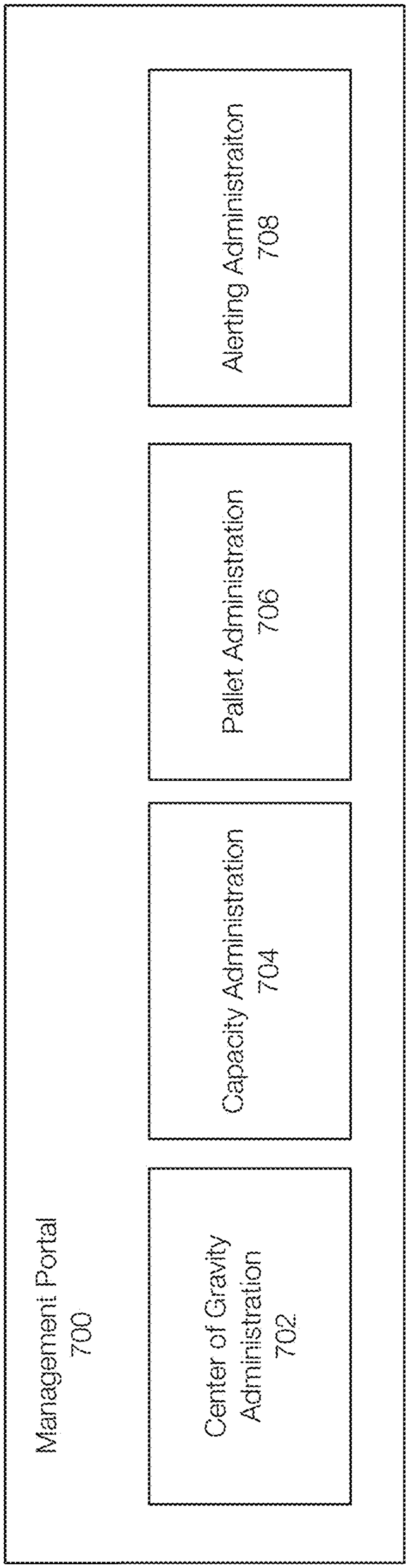
FIG. 7 discloses aspects of a management portal.

FIG. 7 discloses aspects of a management portal. FIG. 7 illustrates a management portion 700 that includes, by way of example only, a center of gravity administration 702, a capacity administration 704, a pallet administration 706, and an alerting administration 708. These administrations may include user interfaces that allow a user or operator to manage alerts, calculations and their thresholds, capacity, pallet visualization, obstruction, availability, and the like. An alert of an obstruction may allow the obstruction to be viewed through the management portal 700.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, logistics operations, shelf management operations, center of gravity operations, capacity operations, open spot operations, placement operations, obstruction detection operations, or the like or combinations thereof. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data protection and/or storage functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, replication services, servers or the like, example, may likewise take the form of software, physical machines or virtual machines (VMs), though no particular component implementation is required for any embodiment.

As used herein, the term 'data' is intended to be broad in scope. Example embodiments of the invention are applicable to any system capable of storing and handling various types of objects, in analog, digital, or other form.

It is noted that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: detecting, by a node associated with a shelf in an environment, a pallet being received into the environment, determining attributes of the pallet, wherein the attributes include a weight of the pallet and dimensions of the pallet, generating a bid, by the node, for placing the pallet on an open spot of the shelf, and receiving the pallet into the open spot for a successful bid of the node.

Embodiment 2. The method of embodiment 1, wherein a tag is applied to the pallet that allows the node to determine a distance and/or position of the pallet in the environment.

Embodiment 3. The method of embodiment 1 and/or 2, wherein the pallet is weighed as the pallet is received into the environment to determine the weight or is weighed by a vehicle configured to carry the pallet and wherein at least one image of the pallet is used to determine the dimensions, wherein the attributes are stored in a pallet data store.

Embodiment 4. The method of embodiment 1, 2, and/or 3, wherein the shelf comprises an ultrawideband anchor, further comprising determining a distance to the pallet by measuring, with the ultrawideband anchor, the distance to the tag.

Embodiment 5. The method of embodiment 1, 2, 3, and/or 4, further comprising determining a center of gravity for each open spot on the shelf by hypothetically placing the pallet in each of the open spots.

Embodiment 6. The method of embodiment 1, 2, 3, 4, and/or 5, further comprising determining a capacity of the shelf.

Embodiment 7. The method of embodiment 1, 2, 3, 4, 5, and/or 6, further comprising determining a score for each of the open spots based on the center of gravity for each of the open spots, a proximity to a vehicle configured to deliver the pallet for each of the open spots, a height of each of the open spots relative to a floor, and/or dimensions of the pallet, wherein open spots with lower centers of gravity and closer proximity to the pallet have higher scores, wherein the bid comprises a best score associated with a particular open spot.

Embodiment 8. The method of embodiment 1, 2, 3, 4, 5, 6, and/or 7, wherein the pallet being received is presented over a message bus to which the node subscribes after being tagged, weighed, and dimensioned.

Embodiment 9. The method of embodiment 1, 2, 3, 4, 5, 6, 7, and/or 8, further comprising detecting an obstruction relative to at least one open spot on the shelf, wherein the bid accounts for the obstruction.

Embodiment 10. The method of embodiment 1, 2, 3, 4, 5, 6, 7, 8, and/or 9, further comprising generating an alert when the pallet is not placed in the open spot associated with the bid.

Embodiment 11. A method comprising: causing a pallet to be tagged with a receiver, weighed, and dimensioned, notifying shelves in the environment that the pallet is ready for placement on one of the shelves, receiving bids from the shelves, wherein each of the bids is associated with an open spot and includes a score, selecting a best bid based on the scores and notifying the shelves of the best bid, and directing a vehicle to deliver the pallet to a shelf associated with the best bid, wherein the pallet is placed in the open spot associated with the best bid.

Embodiment 12. The method of embodiment 11, further comprising monitoring centers of gravity for each of the shelves and generating an alert for each center of gravity that exceeds a threshold center of gravity.

Embodiment 13. The method of embodiment 11 and/or 12, further comprising performing capacity monitoring and generating an alert when capacity is within a threshold of full capacity for the environment.

Embodiment 14. The method of embodiment 11, 12, and/or 13, further comprising generating alerts based on shelf capacities, center of gravity thresholds, spots open for more than a threshold amount of time.

Embodiment 15. The method of embodiment 11, 12, 13, and/or 14, further comprising deploying ultrawideband anchors in the environment, wherein the ultrawideband anchors are configured to use tags placed on pallets in the environment to track the pallets and/or determine positions of the pallets in the environment.

Embodiment 16. The method of embodiment 11, 12, 13, 14, and/or 15, wherein each shelf comprises a compute device and a ultrawideband anchor that are configured to detect pallets on the shelf, wherein attributes of the detected pallets on the shelf are used to a center of gravity of the shelf, a capacity of the shelf, and/or a position on the shelf for each of the open spots.

Embodiment 17. The method of embodiment 11, 12, 13, 14, 15, and/or 16, further comprising receiving, from a shelf, an alert when an incorrect placement is determined.

Embodiment 18. A smart shelf comprising: a compute device configured with applications including a center of gravity application, a capacity application, and a scoring application, an ultrawideband anchor, and shelving for supporting objects, wherein the center of gravity application is configured to determine a center of gravity for the smart shelf as pallets are added to and removed from the shelf, wherein the center of gravity application is hypothetically determine a center of gravity for each open spot on the shelving when a new pallet notification is received, wherein the scoring application is configured to generate a bid that includes a score for each open spot, wherein each score for each open spot is based on a corresponding hypothetical center of gravity, a capacity of the shelf, and/or a height relative to a floor, wherein the scoring application is configured to submit a bid to a logistics system and receive a result indicating whether a new object is scheduled to be placed in the open spot associated with the best bid.

Embodiment 19. The smart shelf of embodiment 18, wherein the object comprises a pallet that has been tagged, weighed, and dimensioned.

Embodiment 20. The smart shelf of embodiment 18 and/or 19, wherein the shelf is configured to generate alerts when the pallet is placed on the shelving in an incorrect open spot and where in the center of gravity and capacity are updated when receiving events from a message bus.

Embodiment 21 A system, comprising hardware and/or software, operable to perform any of the operations, methods, or processes, or any portion of any of these, disclosed herein.

Embodiment 22. A system comprising a plurality of smart shelfs as set for the embodiments 18, 19, and/or 20 and a central node.

Embodiment 23 A non-transitory storage medium having stored therein instructions that are executable by one or more hardware processors to perform operations comprising the operations of any one or more of embodiments 1-17.

The embodiments disclosed herein may include the use of a special purpose or general-purpose computer including various computer hardware or software modules, as discussed in greater detail below. A computer or compute device may include a processor and computer storage media carrying instructions that, when executed by the processor and/or caused to be executed by the processor, perform any one or more of the methods disclosed herein, or any part(s) of any method disclosed. Each shelf, for example, may include a compute device.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, engine, agent, service, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
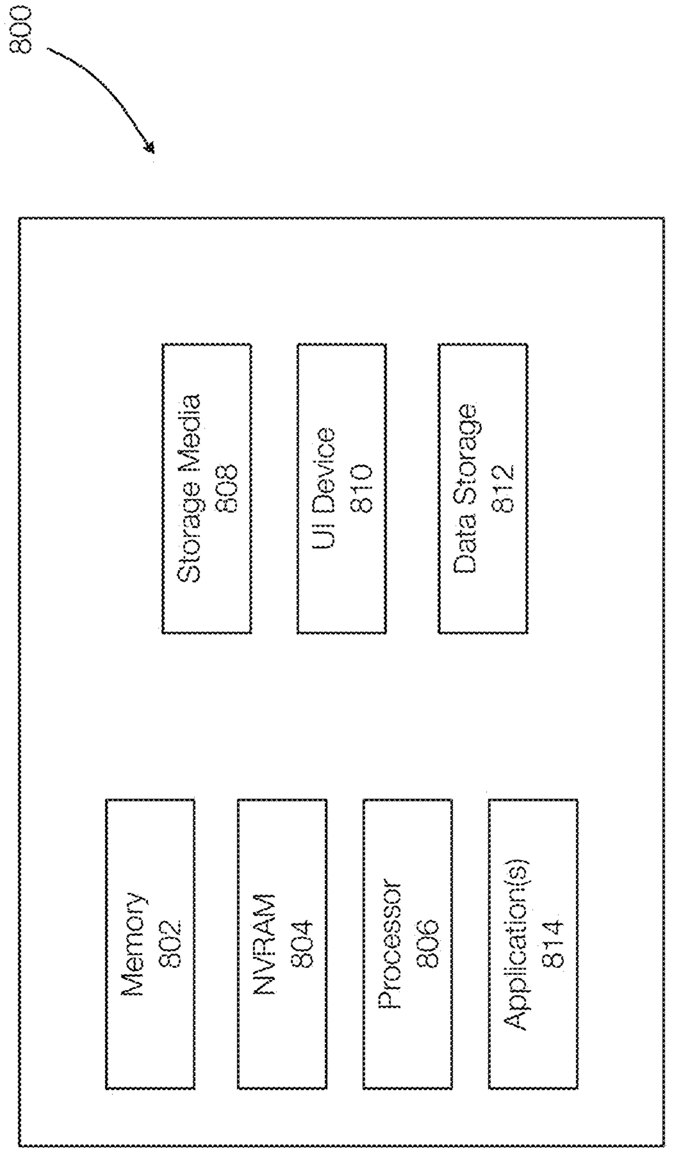
FIG. 8 discloses aspects of a compute device, computer, computing system, or computing entity.

With reference briefly now to FIG. 8, any one or more of the entities disclosed, or implied, by the Figures, and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

detecting, by a compute node associated with a shelf in an environment and comprising a processor, a pallet being received into the environment via an event published on a message bus;

determining attributes of the pallet, wherein the attributes include a weight of the pallet and dimensions of the pallet retrieved from a pallet data store indexed by a tag identifier;

determining, using an ultrawideband anchor associated with the shelf, a position of the pallet relative to the shelf based on distance measurements to a tag attached to the pallet;

generating a bid, by the node, for placing the pallet on an open spot of the shelf, wherein generating the bid comprises, for each open spot on the shelf, computing a projected center of gravity of the shelf by modeling placement of the pallet at that open spot using the pallet weight, the pallet dimensions, and a location of the open spot, and excluding any open spot whose projected center of gravity exceeds a predefined stability threshold; and receiving the pallet into the open spot for a successful bid of the node and verifying correct placement by re-measuring, with the ultrawideband anchor, a distance between the tag and the shelf.

2. The method of claim 1, wherein a tag is applied to the pallet that allows the node to determine a distance and/or position of the pallet in the environment.

3. The method of claim 1, wherein the pallet is weighed as the pallet is received into the environment to determine the weight or is weighed by a vehicle configured to carry the pallet and wherein at least one image of the pallet is used to determine the dimensions, wherein the attributes are stored in a pallet data store.

4. The method of claim 1, wherein the shelf comprises an ultrawideband anchor, further comprising determining a distance to the pallet by measuring, with the ultrawideband anchor, the distance to the tag.

5. The method of claim 1, further comprising determining a center of gravity for each open spot on the shelf by assuming placement of the pallet in each of the open spots using the pallet weight, pallet dimensions, and a spatial location of each of the open spots on the shelf.

6. The method of claim 5, further comprising determining a capacity of the shelf.

7. The method of claim 6, further comprising determining a score for each of the open spots based on the center of gravity for each of the open spots, a proximity to a vehicle configured to deliver the pallet for each of the open spots, a height of each of the open spots relative to a floor, and/or dimensions of the pallet, wherein open spots with lower centers of gravity and closer proximity to the pallet have higher scores, wherein the bid comprises a best score associated with a particular open spot.

8. The method of claim 1, wherein the pallet being received is presented over a message bus to which the node subscribes after being tagged, weighed, and dimensioned.

9. The method of claim 1, further comprising detecting an obstruction relative to at least one open spot on the shelf, wherein the bid accounts for the obstruction.

10. The method of claim 1, further comprising generating an alert when the pallet is not placed in the open spot associated with the bid.

11. A method comprising:

causing a pallet to be tagged with a receiver, weighed, and dimensioned, and storing a weight and dimensions of the pallet in a pallet data store associated with the receiver;

notifying shelves in the environment that the pallet is ready for placement on one of the shelves by publishing a pallet-ready event on a message bus;

receiving bids from the shelves, wherein each of the bids is associated with an open spot and includes a score, wherein each shelf generates its respective bid by, for each open spot on the shelf, computing a projected center of gravity by modeling placement of the pallet at that open spot using the stored pallet weight, the stored pallet dimensions, and a location of the open spot, and excluding any open spot whose projected center of gravity exceeds a predefined stability threshold and each score having been computed by a respective shelf using a projected center of gravity calculated for that open spot based on the pallet weight and dimensions;

selecting a best bid based on the scores that satisfy a center-of-gravity threshold and notifying the shelves of the best bid; and directing a vehicle to deliver the pallet to a shelf associated with the best bid, wherein the pallet is placed in the open spot associated with the best bid and placement is confirmed using distance measurements obtained from ultrawideband anchors, wherein confirming placement comprises verifying correct placement by re-measuring, with an ultrawideband anchor associated with the shelf, a distance between the receiver and the shelf to confirm that the pallet is positioned at the open spot associated with the best bid.

12. The method of claim 11, further comprising monitoring centers of gravity for each of the shelves and generating an alert for each center of gravity that exceeds a threshold center of gravity.

13. The method of claim 11, further comprising performing capacity monitoring and generating an alert when capacity is within a threshold of full capacity for the environment.

14. The method of claim 11, further comprising generating alerts based on shelf capacities, center of gravity thresholds, spots open for more than a threshold amount of time.

15. The method of claim 11, further comprising deploying ultrawideband anchors in the environment, wherein the ultrawideband anchors are configured to use tags placed on pallets in the environment to track the pallets and/or determine positions of the pallets in the environment.

16. The method of claim 11, wherein each shelf comprises a compute device and a ultrawideband anchor that are configured to detect pallets on the shelf, wherein attributes of the detected pallets on the shelf are used to determine a center of gravity of the shelf, a capacity of the shelf, and/or a position on the shelf for each of the open spots.

17. The method of claim 16, further comprising receiving, from a shelf, an alert when an incorrect placement is determined.

18. A smart shelf comprising:

a compute device configured with applications including a center of gravity application, a capacity application, and a scoring application;

an ultrawideband anchor configured to measure distances to tags attached to pallets; and shelving for supporting objects, wherein the center of gravity application is configured to determine a center of gravity for the smart shelf as pallets are added to and removed from the shelf, and to compute, for each open spot on the shelving when a new pallet notification is received, a projected center of gravity by assuming placement of the pallet at the open spot using a stored pallet weight, stored pallet dimensions, and a location of the open spot, wherein the scoring application is configured to generate a bid that includes a score for each open spot, wherein each score for each open spot is based on a corresponding projected center of gravity, a capacity of the shelf, and a height of the open spot relative to a floor, and to exclude open spots whose projected center of gravity exceeds a predefined threshold, wherein the scoring application is configured to submit a bid to a logistics system and receive a result indicating whether a new object is scheduled to be placed in the open spot associated with the best bid, and wherein, in response to receiving the result indicating that the new object is scheduled to be placed in the open spot associated with the best bid, the compute device is further configured to verify correct placement of the new object by causing the ultrawideband anchor to re-measure a distance to a tag attached to the new object and to confirm that the new object is positioned at the open spot associated with the best bid.

19. The smart shelf of claim 18, wherein the object comprises a pallet that has been tagged, weighed, and dimensioned.

20. The smart shelf of claim 19, wherein the shelf is configured to generate alerts when the pallet is placed on the shelving in an incorrect open spot and where in the center of gravity and capacity are updated when receiving events from a message bus.

* * * * *